June 28, 1960   J. D. McGEE ET AL   2,943,206
ELECTRON IMAGE INTENSIFYING DEVICES
Filed Feb. 21, 1957

INVENTORS
James Dwyer McGee
Hugh Devereux Evans
BY
Stevens, Davis, Miller & Mosher
ATTORNEYS

United States Patent Office 2,943,206
Patented June 28, 1960

2,943,206

ELECTRON IMAGE INTENSIFYING DEVICES

James Dwyer McGee and Hugh Devereux Evans, London, England, assignors to National Research Development Corporation, London, England Filed Feb. 21, 1957, Ser. No. 641,678

Claims priority, application Great Britain Feb. 29, 1956

11 Claims. (Cl. 250—207)

This invention relates to radiation detectors, particularly to radiation detectors for detecting distribution or images of X-rays or gamma-rays.

The technique of introducing radioactive tracer substances into a system, such as an animal or plant system, and noting the subsequent distribution therein is well known. Various methods have been proposed for determining the distribution in such a system. Most practical apparatus depends on measuring the intensity of gamma-radiation point by point by scanning the area mechanically with one or more scintillation counters and displaying the resultant distribution on a cathode ray tube or plotting it on a paper chart.

The main disadvantages of such a method are that the distribution picture is built up slowly line by line and is not complete until the scanning is completed. Hence movement of the picture for example due to movement of the radioactive substances within the system cannot be observed. Furthermore, only a very small part of the total radiation is detected at any instant during the scanning period, so that unnecessarily large concentrations of radioactive tracers are necessary.

The object of the present invention is to provide a radiation detector able to indicate the radiation intensity pattern over an area by detecting the radiation from all parts at the same time and distinguishing different radiation intensities from different parts of the area. Such a detector is able to provide a visual counterpart of an X-ray image or of gamma-radiation pattern and to show change in the image or pattern during the period of observation.

According to the present invention, a radiation detector comprises a first layer excitable to emit light by incident radiation, a second layer arranged behind the first and excitable to emit electrons by incident light from the first layer and a third layer arranged behind the second layer and excitable to emit light by incident electrons, there being interposed between the second and third layers an electron multiplying electrode structure comprising a plurality of grid electrodes maintained at potentials progressively more positive from the second layer to the third layer, each grid comprising parallel passages extending from the front face of the grid to the rear face thereof and having a screen grid arranged between consecutive grid electrodes, the passage openings of consecutive grids being aligned to provide a series of separate electron-multiplying channels throughout the electrode structure.

By this means a radiation image or other intensity pattern on the first layer is divided into elements according to the number of channels provided and reconstructed into a visual image or pattern on the third layer.

Preferably the radiation detector has a deep grid arranged in front of the first layer having a series of parallel passages extending from the front face of the grid to the rear face thereof. By a deep grid is meant a structure in which the length of the passages between front and rear faces exceeds their spacing transversely. These passages should be aligned with the passages of the electron multiplying electrode structure, otherwise the definition of the image is impaired.

In particularly useful embodiments, the first layer is sensitive to incident X-rays or to incident gamma-rays. The deep grid in front of the first layer is required to be of heavy metal and so to restrict the acceptance angle of radiation by the first layer.

In order that the invention may be reasily carried into effect, one embodiment will be particularly described, by way of example, with reference to the accompanying drawings, of which:

Figure 2a is a transverse section through a complete radiation detector showing the individual dynodes in section as shown in Figure 1a;

As shown in the accompanying drawings, the radiation detector comprises a first layer 6, which in this example is a gamma-ray sensitive phosphor such as zinc sulphide or sodium iodide. This layer is carried on a thin plate 8 of glass, to the rear face of which is applied a second layer 9 of photoemissive material. In the present example, the layer 9 is formed as an antimony-caesium photo-cathode.

Figure 1:
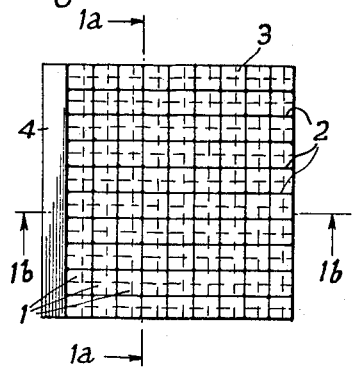
Figure 1 is a front view of a single grid electrode, referred to herein as a dynode, forming part of an electron multiplying electrode structure used in a radiation detector.

Behind the layer 9 is an electron multiplying electrode structure comprising a plurality of dynodes 4 each one similar to that shown in Figure 1. In this example, ten dynodes are used, six being shown in Figure 2a and 2b. The number used is not critical.

Behind the electrode structure is a fluorescent screen 5 which may also be of zinc sulphide. The complete radiation detector is mounted in an evacuated glass envelope 10 and the fluorescent screen 5 is conveniently deposited on the inner face of the rear wall.

In front of the phosphor 6 is a deep grid 7 of cast lead having a number of passages 11 extending from the front face of the grid to the rear. The length of the passages 11 from face to face of the grid is several times their spacing transversely.

Figure 1B:
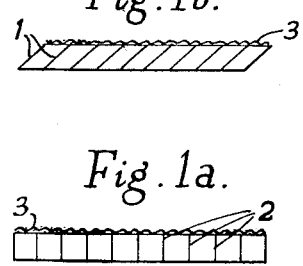
Figure 1b is a transverse section of the dynode on the line B—B of Figure 1.
Figure 1A:
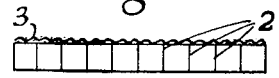
Figure 1a is a transverse section of the dynode on the line A—A of Figure 1.

As shown in Figures 1, 1a and 1b, each dynode comprises a grid made up of a series of wall members 1, 2 arranged at right angles to form a series of passages of square cross-section. The members 2 are arranged in planes perpendicular to the front face but the members 1 are arranged in planes at 45° to the front face, after the manner of a Venetian blind. The distance between the front and rear faces of the grid is the same as the distance separating adjacent passages.

The grid is made by assembling and soldering together columns and rows of small rectangular cross-section metal tubes of nickel, stainless steel or copper which are coated internally with antimony-cesium. The resultant multi-channeled block is then sawn into sections at 45° to the longitudinal axis.

Each dynode is provided with a fine wire mesh grid 3 extending over its front face.

Figure 2A:
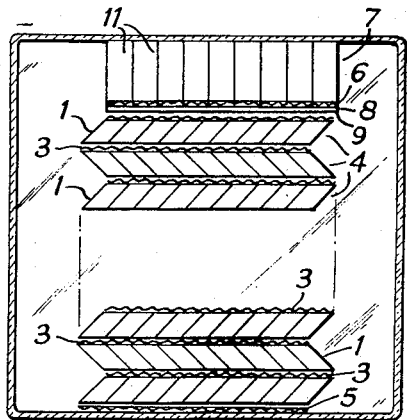
Figure 2B:
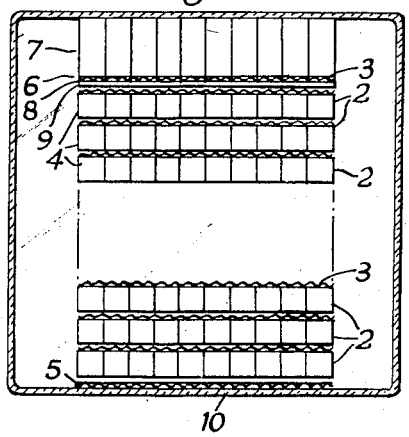
Figure 2b is the transverse section in a plane at right angles to that of Figure 2a, showing the individual dynodes in section as shown in Figure 1b.
Figure 3:
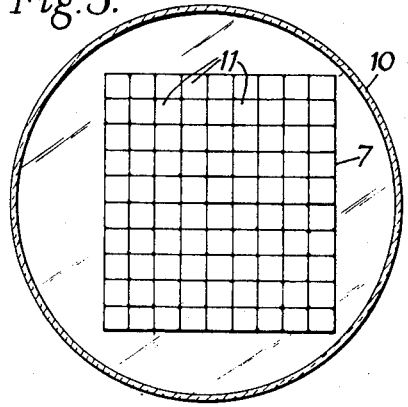
Figure 3 is a front view of the radiation detector of Figures 2a and 2b.

The dynodes are assembled one behind another with the inclined passages of successive dynodes oppositely inclined in one transverse plane as shown in Figure 2a, In the plane of Figure 2a, and in the parallel planes through the other rows of passages, the passages zig-zag through the electrode structure with a right angle bend at every dynode interface.

The dynodes are insulated from one another and are connected to tappings of a potential divider whereby the first dynode is maintained at a potential of about 200 volts positive with respect to the grid 7 and each successive dynode is maintained at a potential about 200 volts positive with respect to the preceding dynode.

In operation, the grid 7 is directed towards the distributed source or sources of gamma-rays to be examined, the incident rays being canilised into a number of substantially parallel beams in the passages 11, rays arriving at a wide angle to the direct line of incidence being intercepted by the passage walls. The gamma-rays falling on the phosphor layer 6 excite the layer to emit light the intensity of which is in direct proportion to the intensity of the incident radiation in each channel. The light emitted by the corresponding elements of the layer 6 lying at the end of each passage 11 is transmitted by the glass plate 8 to fall on the photo-cathode 9. From the photo-cathode 9, electrons are emitted in proportion to the incident light intensity from the elements of the layer 6. These electrons are attracted to and enter the passages of the first dynode and, since the dynode passages are aligned with the grid passages 11, the number of electrons entering each dynode passage are in direct relationship to the incident radiation intensity in the corresponding passage 11. The primary electrons from the photo-cathode 9 fall on the walls, particularly the inclined walls, of the dynode passages to release secondary electrons in proportion. These secondary electrons are attracted into the corresponding passage of the next dynode to release further secondary electrons. This process continues for each successive dynode, the electron multiplication of each stage being some 3 to 5 times with the construction and potentials stated. The screen 3 of each dynode screens the secondary electrons released in that dynode from the field of the earlier dynode. The electrons leaving the last dynode impinge upon the fluorescent screen 5 causing this to fluoresce in the region opposite each dynode passage opening to a brightness dependent upon the incident electron beam intensity.

Thus a large number of adjacent channels, simultaneously and continuously operating, exist throughout the device so that an incident radiation intensity pattern is broken down into elements and reconstructed as a visual pattern on the fluorescent screen 5.

The incident radiation pattern is instantly visible and hence movement in the pattern can be observed as it occurs.

The detector acts in exactly similar manner for incident X-rays forming a pattern or image on the layer 6.

The grid 7 and dynodes 4 illustrated in the drawings have nine rows and ten columns of passages giving a total of ninety channels. It will be readily appreciated that the definition of the detector is improved as the number of channels per unit area is increased.

We claim:

1. In an electron image intensifying device having a photo-emissive layer and a fluorescent layer, a plurality of electron-multiplying electrodes arranged consecutively between said photo-emissive layer and said fluorescent layer, each electron-multiplying electrode comprising a number of open-ended tubes arranged with their axes parallel, the open ends of said tubes of each electrode defining spaced plane parallel faces of said electrode, consecutive electrodes being arranged with spaced parallel faces and with the open ends of said tubes of one electrode aligned, in the direction perpendicular to the plane faces, with the open ends of the tubes of the next electrode so that the tubes of the said electrodes define spaced sections of a plurality of canals extending from said photo-emissive layer to said fluorescent layer, an electrically conductive screen being arranged between the faces of consecutive electrodes and said electrodes being maintained at potentials which are increasingly positive in the direction from said photo-emissive layer to said fluorescent layer.

2. In an electron image intensifying device as defined in claim 1, said plurality of electron-multiplying electrodes having said electrically conductive screen arranged between the faces of consecutive electrodes and electrically connected to the electrode nearer the said fluorescent screen.

3. In an electron image intensifying device having a photo-emissive layer and a fluorescent layer, a plurality of electron-multiplying electrodes arranged consecutively between said photo-emissive layer and said fluorescent layer, each electron-multiplying electrode comprising a number of open-ended tubes arranged with their axes parallel, the open ends of said tubes of each electrode defining spaced plane parallel faces of the electrode, said tube axes extending obliquely to the said plane faces, consecutive electrodes being arranged with spaced parallel faces and with the open ends of said tubes of one electrode aligned, in the direction perpendicular to the plane faces, with the open ends of said tubes of the next electrode, the axes of said tubes of the one electrode being at an angle to the axes of said tubes of the next electrode, so that said tubes of the said electrodes define spaced straight sections of a plurality of zig-zag canals extending from said photo-emissive layer to said fluorescent layer, an electrically conductive screen being arranged between the faces of consecutive electrodes and the electrodes being maintained at potentials which are increasingly positive in the direction from said photo-emissive layer to said fluorescent layer.

4. In an electron image intensifying device as defined in claim 3, said plurality of electron-multiplying electrodes having said axes of said tubes of one electrode making substantially a right angle with said axes of said tubes of the next electrode.

5. In an electron image intensifying device as defined in claim 3, said plurality of electron-multiplying electrodes having said electrically conductive screen arranged between the faces of consecutive electrodes and electrically connected to the electrode nearer said fluorescent screen.

6. A radiation intensity pattern detector comprising a phosphor layer sensitive to the radiation to be detected, a photo-emissive layer and a fluorescent layer arranged in the sequence stated, a plurality of electron-multiplying electrodes arranged consecutively between said photo-emissive layer and said fluorescent layer, each electron-multiplying electrode comprising a number of open-ended tubes arranged with their axes parallel, the open ends of said tubes of each electrode defining spaced plane parallel faces of said electrode, consecutive electrodes being arranged with spaced parallel faces and with the open ends of said tubes of one electrode aligned, in the direction perpendicular to the plane faces, with the open ends of the tubes of hte next electrode so that the tubes of the said electrodes define spaced sections of a plurailty of canals extending from said photo-emissive layer to said fluorescent layer, an electrically conductive screen being arranged between the faces of consecutive electrodes and said elecrtdoes being maintained at potentials which are increasingly positive in the direction from said photo-emissive layer to said fluorescent layer.

7. A radiation intensity pattern detector as defined in claim 6, having a deep grid arranged in front of said phosphor layer, said grid comprising parallel tubes defining canals for incident radiation terminating at said phosphor screen, the rear ends of said tubes of said grid being aligned with the front ends of the tubes of the first of said electron-multiplying electrodes.

8. A radiation intensity pattern detector as defined in claim 6, in which the phosphor layer is sensitive to a radiation in the group comprising X-rays and gamma rays.

9. A radiation intensity pattern detector comprising a phosphor layer sensitive to the radiation to be detected, a photo-emissive layer and a fluorescent layer arranged in the sequence stated, a plurality of electron-multiplying electrodes arranged consecutively between said photo-emissive layer and said fluorescent layer, each electron-multiplying electrode comprising a number of open-ended tubes arranged with their axes parallel, the open ends of said tubes of each electrode defining spaced plane parallel faces of the electrode, said tube axes extending obliquely to the said plane faces, consecutive electrodes being arranged with spaced parallel faces and with the open ends of said tubes of one electrode aligned, in the direction perpendicular to the plane faces, with the open ends of said tubes of the next electrode, the axes of said tubes of the one electrode being at an angle to the axes of said tubes of the next electrode, so that said tubes of the said electrodes define spaced straight sections of a plurality of zig-zag canals extending from said photo-emissive layer to said fluorescent layer, an electrically conductive screen being arranged between the faces of consecutive electrodes and the electrodes being maintained at potentials which are increasingly positive in the direction from said photo-emissive layer to said fluorescent layer.

10. A radiation intensity pattern detector as defined in claim 9, having a deep grid arranged in front of said phosphor layer, said grid comprising parallel tubes defining canals for incident radiation terminating at said phosphor screen, the rear ends of said tubes of said grid being aligned with the front ends of the tubes of the first of said electron-multiplying electrodes.

11. A radiation intensity pattern detector as defined in claim 9 in which the phosphor layer is sensitive to a radiation in the group comprising X-rays and gamma rays.

References Cited in the file of this patent

UNITED STATES PATENTS

| | | |
|---|---|---|
| Re. 23,802 | Sheldon | Mar. 16, 1954 |
| 2,196,691 | Batchelor | Apr. 9, 1940 |
| 2,234,801 | Gorlich | Mar. 11, 1941 |
| 2,612,610 | Marshall et al. | Sept. 30, 1952 |
| 2,666,856 | Fua et al. | Jan. 19, 1954 |
| 2,821,637 | Roberts et al. | Jan. 28, 1958 |